United States Patent
LaMothe et al.

(10) Patent No.: US 8,721,461 B2
(45) Date of Patent: May 13, 2014

(54) OVER-MOLDED VENT VALVE

(75) Inventors: Eric James LaMothe, Goodrich, MI (US); Michael James Miller, White Lake, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 42 days.

(21) Appl. No.: 13/554,167

(22) Filed: Jul. 20, 2012

(65) Prior Publication Data

US 2014/0024466 A1 Jan. 23, 2014

(51) Int. Cl.
F16D 3/84 (2006.01)
F16N 1/00 (2006.01)
F16D 3/223 (2011.01)

(52) U.S. Cl.
USPC ................ 464/15; 464/17; 464/906; 137/849

(58) Field of Classification Search
USPC .................. 464/7, 15, 17, 904–906; 137/849
See application file for complete search history.

(56) References Cited

U.S. PATENT DOCUMENTS

| | | | |
|---|---|---|---|
| 4,762,308 A * | 8/1988 | Geno | 137/849 |
| 5,794,661 A * | 8/1998 | Natalizia | 137/849 |
| 6,010,409 A | 1/2000 | Johnson | |
| 6,322,452 B1 * | 11/2001 | Kondo | 464/17 |
| 6,530,843 B2 | 3/2003 | Miller et al. | |
| 6,540,616 B2 | 4/2003 | Miller et al. | |
| 6,550,595 B2 | 4/2003 | Kuczera | |
| 6,699,129 B2 | 3/2004 | Wang | |
| 6,793,581 B2 | 9/2004 | Meyer et al. | |
| 6,830,074 B2 | 12/2004 | Wang | |
| 6,840,137 B2 | 1/2005 | Kaplan et al. | |
| 6,988,949 B2 | 1/2006 | Wang | |
| 7,204,760 B2 | 4/2007 | Wang | |
| 7,677,982 B2 | 3/2010 | Compau et al. | |
| 8,016,162 B2 | 9/2011 | Cleary et al. | |
| 8,197,346 B2 | 6/2012 | Miller et al. | |
| 2009/0230634 A1 | 9/2009 | Cermak | |

* cited by examiner

*Primary Examiner* — Gregory Binda
*Assistant Examiner* — Josh Skroupa
(74) *Attorney, Agent, or Firm* — Jennifer M. Brumbaugh; Reising Ethington P.C.

(57) ABSTRACT

A constant velocity joint may include a joint chamber and a cover defining a bore and configured to seal the joint chamber and prevent lubricant from leaving the joint chamber. A vent valve may be disposed within the bore and define at least one opening. The opening may be a one-way valve configured to exhaust gas from the joint chamber and while maintaining lubricant within the joint chamber.

15 Claims, 3 Drawing Sheets

OVER-MOLDED VENT VALVE

TECHNICAL FIELD

Described herein is a constant velocity joint and an improved vent and venting system therefore.

BACKGROUND

Constant velocity joints (CV joints) are common components in vehicles. Constant velocity joints are often employed where transmission of a constant velocity rotary motion is desired or required. CV joints are typically greased or otherwise lubricated for the life of the component. The joints are preferably sealed to retain the grease or lubricant inside the joint while keeping contaminants and foreign matter, such as water and dirt, out of the joint. Moreover, a sealing boot, which may be made of rubber, thermoplastic, silicone material, or the like usually encloses portions of the CV joints (such as an open end). Additionally, the opposite end of the joint may also be enclosed with an internal cover to close off the CV joint from contaminants.

During operation, a CV joint may create excess internal pressures in the inner chamber of the joint. This function can prevent undesirable pressure build-up during operation of the joint that could damage or compromise components such as the sealing boot. In such instances, it is often desirable to vent pressurized gases from the chamber of the joint to the outer atmosphere to reduce the internal pressure and temperature of the joint. Consequently, many CV joints include a vent.

Vent designs generally must strike a compromise between designs that are either generally permissive or generally restrictive to flow through the vents. While vents incorporating simple configurations generally freely allow venting of gases to and from the joint chamber, such designs necessarily also allow intrusion of water or other external contaminants. On the other hand, vents incorporating relatively complex features may offer more resistance to water and other external contaminants, but may restrict venting of gases to and from the joint chamber.

Accordingly, there is a need for a vent for a CV joint that allows for proper venting of the joint chamber with the external atmosphere, improved sealing of the joint chamber against exterior contaminants, and increased resistance to clogs from joint lubricant.

DETAILED DESCRIPTION

Figure 1:
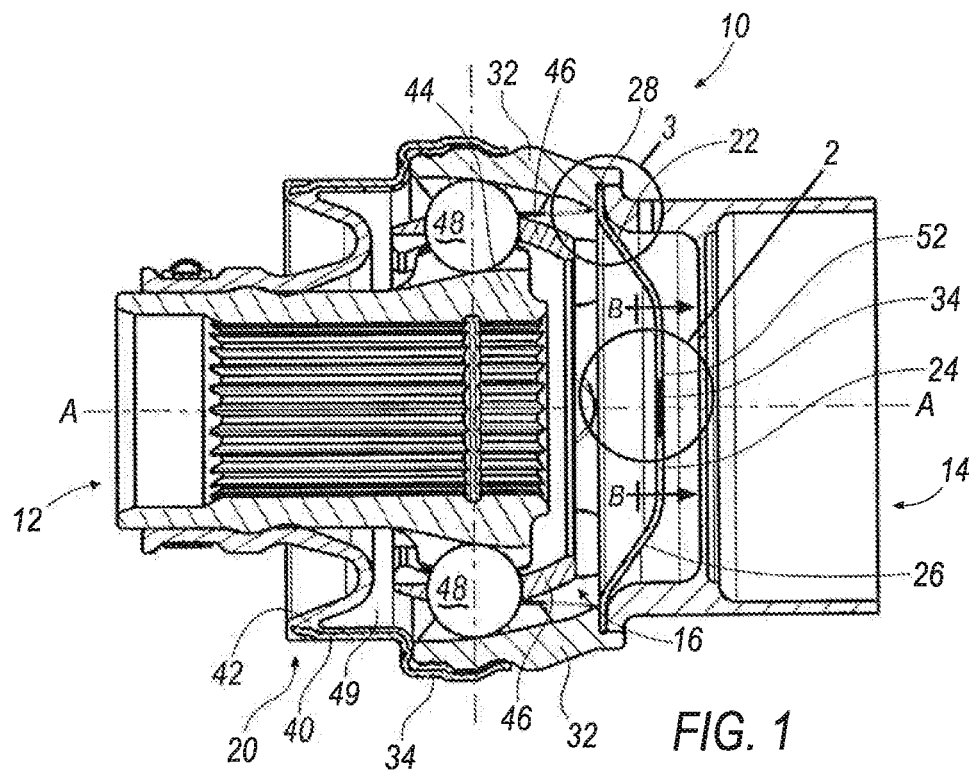
FIG. 1 is a sectional view of a constant velocity joint.

Referring to the drawings, a constant velocity joint (CV Joint) is shown. It should be noted that all types of CV joints, such as plunging tripods, fixed ball joints, etc., may be used with the present disclosure. Advantages realized by the disclosure may be applied to substantially all types of constant velocity joints, and, therefore, the disclosure should not be limited to the illustrated embodiments.

Further, references in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment."

Referring to FIG. 1, a CV joint 10 having a central axis A-A is illustrated according to an embodiment. The CV joint 10 includes a driving end 12 and a driven end 14. The CV joint 10 further includes a joint assembly 16 coupled to a shaft (not illustrated) with a boot cover assembly 20 connected there between. The CV joint 10 may further include a grease cover 22 that seals the driven end 14. The grease cover 22 may have an umbrella or dome-like shape. The grease cover 22 may have a central portion 24 that forms a substantially flat, central portion of the dome. A sloped portion 26 may extend from the central portion 24 therefrom to a cap 28 that is press fit against an outer race 32. The grease cover may define a bore 52 at a center of the central portion 24. The grease cover 22 may include a vent valve 34 having a central body portion 36 configured to fit within the bore 52. The boot cover assembly 20 may include a metal cover 40 and a flexible CV joint boot 42. A portion of metal cover 40 may be crimped, or attached by another mechanism, onto boot 42 for attachment thereto. The boot cover assembly 20 and the grease cover 22 protect the moving parts of the CV joint 10 during operation by retaining the grease or lubricant inside the joint 10 while keeping contaminants and foreign matter, such as water and dirt, out of the joint assembly 16.

The joint assembly 16 may include a cage 46, a first rotational member or outer race 32, a second rotational member or inner race 44, and a plurality of balls 48. The cage 46 retains the balls 48 between the first rotational member 32 and the second rotational member 44 in a generally equally spaced circumferential orientation. The shaft is splined to second rotational member 44 to allow axial movement there between.

Collectively, at least the shaft, the boot cover assembly 20, the first rotational member 32, the second rotational member 44, and the grease cover 22, form a joint chamber 49. The joint chamber 49 contains grease or other lubricants (not shown) for lubrication between the cage 46, the first rotational member 32, the second rotational member 44, and the balls 48. During operation of the CV joint 10, lubricant contained within joint chamber 49 will generally be drawn outwards towards first rotational member 32 by centrifugal forces generated by the spinning of the CV joint 10. This results in the formation of a "grease-free zone" around a center portion of the joint chamber 49, typically including at least the shaft and the vent valve 34. The size of the grease-free zone will depend partly on the amount of lubricant contained within joint chamber 49. The grease cover 22 may help prevent grease and other lubricant from leaving the chamber 49.

Figure 2:
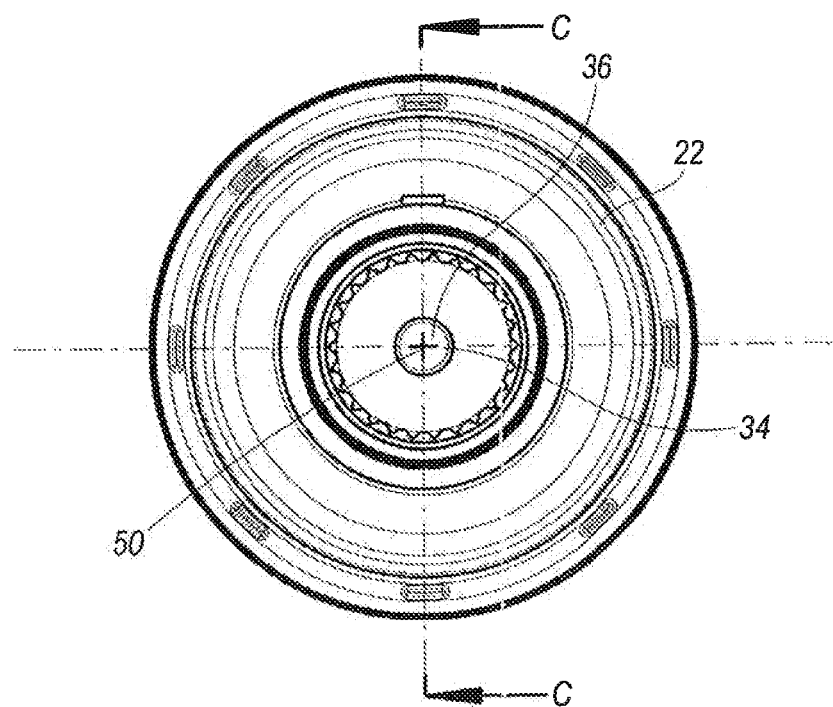
FIG. 2 is a partial view of a vent valve, taken from the encircled area 2 and line B-B of FIG. 1.
Figure 3:
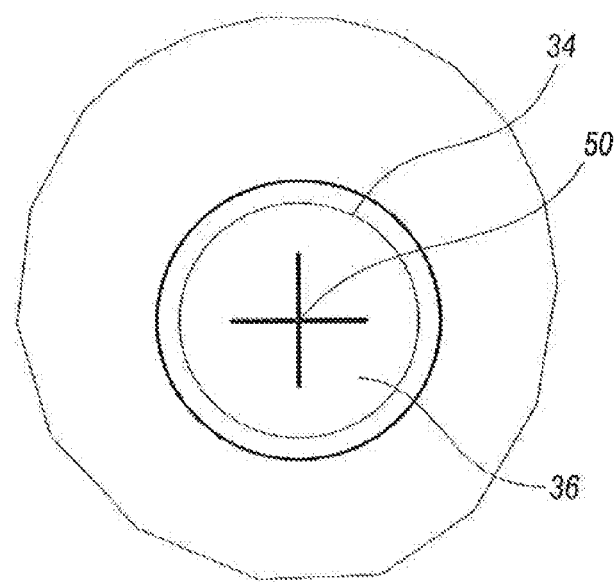
FIG. 3 is a partial view of the vent valve of FIG. 2.

Referring to FIGS. 2 and 3, the vent valve 34 is illustrated in further detail. The vent valve 34 may define at least one opening 50 in the body portion 36. The opening 50 may be a slit, a plurality of slits, a hole, etc. By way of example only, the opening 50 may include a first slit and a second slit running perpendicular to and intersecting the first slit so as to form a cross-like opening, as shown in the Figures. A star-like opening may also be formed by making additional slits the central body portion 36. The opening 50 may allow high pressure air to pass from the joint chamber 49 through the bore 52, while preventing greases or other lubricants contained within the joint chamber 49 from being exhausted during the venting of the joint chamber 49.

The vent valve 34 may form a one-way valve, allowing air or gas to escape through the opening 50. The vent valve 34 may be formed of a first material configured to provide enough flexibility to allow high pressure air to escape through the opening 50, while maintaining enough rigidity to keep any grease or lubricant within the joint chamber 49. Moreover, the vent valve 34 may be flexible enough to allow deflection of the vent valve 34 during insertion into the bore 52. Examples include a variety of pliable materials which may be injection molded to integrally form the vent valve 34, such as a low to medium temperature polychloroprene materials, durometer silicone materials, neoprene materials, thermoplastic and elastomeric materials, Hydrogenated Nitrile Butadiene Rubber (NBR) materials, Hydrogenated Nitrile Butadiene Rubber (HNBR) materials, and higher temperature silicone or flourosilicone materials. The grease cover 22 may be formed of a second material, distinct from the first material. It may be formed of steel, or any other type of ceramic, hard plastic, metal composite material, etc., depending on the needs and design requirements of the constant velocity joint 10.

Figure 4:
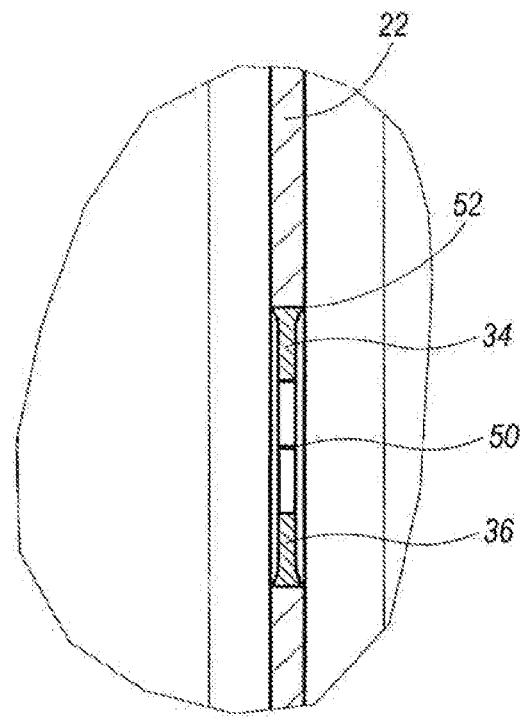
FIG. 4 is a partial sectional view of a vent valve, taken from the encircled area 2 of FIG. 1 and line C-C of FIG. 2.

As shown in FIG. 4, the central body portion 36 of the vent valve 34 is disposed within a hole or the bore 52 defined by the grease cover 22. The bore 52 is preferably located inside a grease-free zone of the CV joint 10, thereby generally preventing grease from accumulating near the bore 52 and the vent valve 34 during operation of the CV joint 10. The vent valve 34 has a generally cylindrical shape with a diameter that provides a press fit within the bore 52. Accordingly, a periphery of the vent valve is joined to the grease cover 22. The body portion 36 of the vent valve 34 is configured to move axially at the region near or at the opening 50 in response to a pressure differential between the joint chamber 49 and the external atmosphere.

Figure 5:
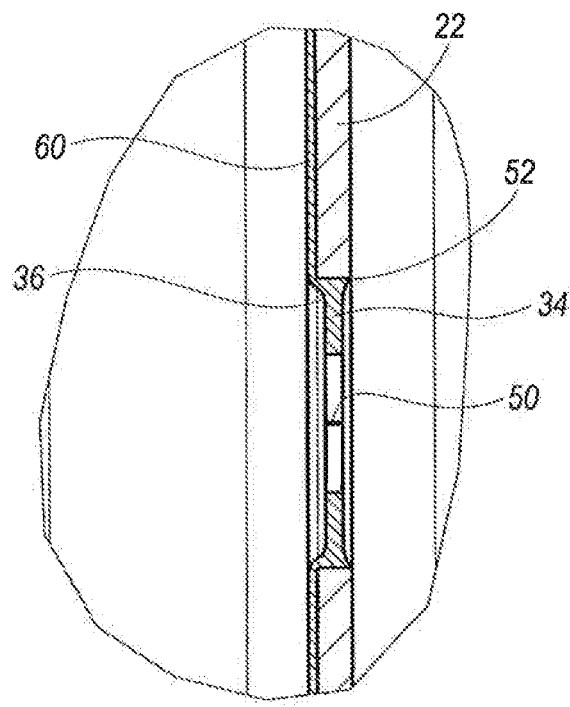
FIG. 5 is a another partial sectional of a vent valve, taken from the encircled area 2 of FIG. 1 and line C-C of FIG. 2.
Figure 6:
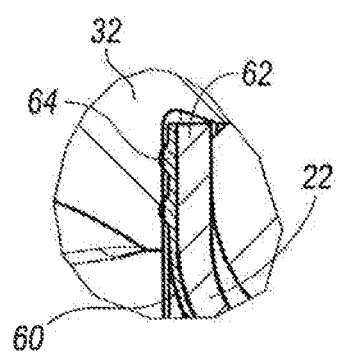
FIG. 6 is a partial sectional view of a cap seal, taken from the encircled area 3 of FIG. 1.

Additionally or alternatively, the vent valve 34 may include a cap seal 60, as shown in FIGS. 5 and 6. The cap seal 60 extends circumferentially around the central body portion 36 of the vent valve 34, abutting the interior of the grease cover 22. While the central body portion 36 may fit within the bore 52, the cap seal 60 may extend along the grease cover 22 from the outer perimeter of the bore 52 to a grease cover end 62. The grease cover end 62 may abut a lip of the outer race 32, thus creating a press fit between the outer race 32 and the grease cover 22. The cap seal 60 at the grease cover end 62 may seal the grease cover 22 within the outer race 32, further preventing lubricant, air, gas, etc., from leaving the joint assembly 16. The cap seal and end 62 may include at least one notch 64 projecting therefrom to facilitate the sealing of the cap seal 60 to the outer race 32.

During manufacture, the vent valve 34 may be formed via a molding technique, such as injection molding, and then inserted within the bore 52. In the example above wherein the vent valve 34 includes a cap seal 60, the cap seal 60 may be over-molded at the same time as the central body portion 36. The vent valve 34, including the cap seal 60 and the central body portion 36, may then be abutted against the interior of the grease cover 22. Thus, the cap seal and vent valve 34 may be formed and placed substantially simultaneously thus eliminating separate assembly steps for each the seal and the vent valve 34. Moreover, an additional mold for creating the cap seal is also eliminated, making the component costs and assembly procedures more efficient.

The vent valve 34 therefore provides a mechanism for venting the CV joint 10 during operation or assembly of the CV joint 10, while also generally preventing expulsion or grease or other lubricants from joint chamber 49, and further inhibiting intrusion of external contaminants into the joint chamber 49. The vent valve 34 described herein may be implemented on any type of fixed or plunge CV joint and the complexity of the components and processes are reduced.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A constant velocity joint, comprising:
   a joint chamber,
   a cover defining a bore and configured to seal the joint chamber and prevent lubricant from leaving the joint chamber, and
   a vent valve disposed in the bore and having a body portion, the body portion defining at least one opening, wherein the opening forms a one-way valve configured to reduce pressure in the joint chamber while maintaining lubricant within the joint chamber, wherein the vent valve includes a cap seal extending radially from the body portion and abutting the cover between the bore and a cover end, and wherein a seal is formed at the cover end by the cap seal, the cap seal configured to abut an outer race and seal the cover to the joint chamber.

2. The constant velocity joint of claim 1, wherein the vent valve is formed of a first material and the cover is formed of a second material.

3. The constant velocity joint of claim 2, wherein the first material is a flexible material configured to allow gas to flow from the joint chamber through the opening.

4. The constant velocity joint of claim 1, wherein the opening is configured as a plurality of slits in the vent valve forming a cross-like opening.

5. The constant velocity joint of claim 1, wherein the cap seal includes at least one notch projecting outwardly therefrom for engaging the outer race.

6. The constant velocity joint of claim 1, wherein the vent valve is formed of at least one of a polychloroprene material, durometer silicone material, neoprene material, thermoplastic and elastomeric material, Nitrile Butadiene Rubber (NBR) material, Hydrogenated Nitrile Butadiene Rubber (HNBR) material, high temperature silicone material, or high temperature fluorosilicone material.

7. The constant velocity joint of claim 1, wherein the body portion forms a press fit within the bore.

8. The constant velocity joint of claim 1, wherein the bore is defined at a center of the cover.

9. The constant velocity joint of claim 1, wherein the opening of the vent valve is in axial alignment with the bore of the cover.

10. A vent valve for a constant velocity joint, comprising:
a body portion disposed in a bore defined by a grease cover thereby creating a press fit within the bore,
wherein the body portion defines an opening configured to reduce pressure in a joint chamber of the constant velocity joint, and
a cap seal extending radially from the body portion and configured to abut at least a portion of the grease cover between the bore and a cover end, creating a seal at the cover end, the cap seal configured to abut an outer race and seal the cover to the joint chamber.

11. The vent valve of claim 10, wherein the vent valve is formed of a flexible material configured to allow gas to flow from the joint chamber through the opening.

12. The vent valve of claim 10, wherein the opening is configured as a plurality of slits in the vent valve forming a cross-like opening.

13. The vent valve of claim 10, wherein the cap seal includes at least one notch projecting outwardly therefrom for engaging the outer race.

14. The vent valve of claim 10, wherein the vent valve is formed of at least one of a polychloroprene material, durometer silicone material, neoprene material, thermoplastic and elastomeric material, Nitrile Butadiene Rubber (NBR) material, Hydrogenated Nitrile Butadiene Rubber (HNBR) material, high temperature silicone material, or high temperature fluorosilicone material.

15. A constant velocity joint, comprising:
a joint chamber;
a boot cover assembly located at or near one end of the constant velocity joint;
a cover located at or near another end of the constant velocity joint, said cover at least partly sealing said joint chamber; and
a vent valve located in a bore of said cover, said vent valve having an opening that, during operation of the constant velocity joint, allows gas from said joint chamber to escape therethrough, said vent valve including a cap seal extending radially therefrom and abutting at least a portion of said cover between the bore of said cover and a cover end, said cap seal abutting an outer race of the constant velocity joint and sealing said cover at said joint chamber.

* * * * *